United States Patent [19]
Fujimoto et al.

[11] 3,942,169
[45] Mar. 2, 1976

[54] PATTERN RECOGNITION SYSTEM

[75] Inventors: Yoshiji Fujimoto, Hachioji; Shozo Kadota, Kokubunji; Michio Yasuda, Koganei; Shinichi Hayashi, Kokubunji; Toshihiro Hananoi, Odawara, all of Japan

[73] Assignee: Hitachi, Ltd., Japan

[22] Filed: Sept. 6, 1974

[21] Appl. No.: 503,956

[30] Foreign Application Priority Data
Sept. 10, 1973 Japan.............................. 48-101202

[52] U.S. Cl.............. 340/146.3 AE; 340/146.3 AQ
[51] Int. Cl.² ......................................... G06K 9/12
[58] Field of Search............ 340/146.3 AE, 146.1 R, 340/146.1 A; 235/177

[56] References Cited
UNITED STATES PATENTS
3,609,685  9/1971  Deutsch..................... 340/146.3 AE

*Primary Examiner*—Leo H. Boudreau
*Attorney, Agent, or Firm*—Craig & Antonelli

[57] ABSTRACT

A character pattern recognition system is disclosed in which an unknown input pattern of character and a standard pattern of character are described and maintained in the form of a sequence of Freeman direction codes. One-to-multiple and multiple-to-one correspondence is permitted between the codes, to obtain a specific correspondence between them in which the sum of the difference between direction codes is minimum, so that the minimum value of code difference is used as a measure of determining the similarity between the two patterns.

2 Claims, 14 Drawing Figures

FIG. 9

| NUMBER OF COMPONENTS | NUMBER OF LOOPS | NUMBER OF EDGES | | | | | | | |
|---|---|---|---|---|---|---|---|---|---|
| | | 1 | 2 | 3 | 4 | 5 | 6 | 7 | 8 |
| 1 | 0 | — | — | ⊥ | + | ⋊ | ⋏ | ⊬⊦ | ⊥⊦ |
| | 1 | ○ | ⟟ | ⟠ | ⟠ | ⟟○ | ⟟○ | | |
| | 2 | | ∞ | ∞⊖ | ⊖ | ∞⊖ | | | |
| 2 | 0 | | ‖ | ⊦⊦ | ⊦⊦ | ⊦⊦ | ⊦⊦ | | |
| | 1 | | ⊦○ | ⊦○ | | | ⊦⊦○ | | |

3,942,169

PATTERN RECOGNITION SYSTEM

BACKGROUND OF THE INVENTION

1. Field of the Invention

This invention relates to a pattern recognition system or more in particular to a pattern recognition system in which patterns of unknown and standard characters are described in the form of Freeman direction codes so that a minimum value of the sum of the differences between the two types of codes is used as a measure for determining the similarity between the two types of patterns thereby to recognize the unknown pattern.

2. Description of the Prior Art

The recognition of characters of a font of fixed shape such as machine-printed characters is comparatively easily effected by a matching process such as a correlation between an input pattern of character and a standard pattern of character. In the event that a plurality of fonts of machine-printed characters are involved, however, there are as many different shapes as fonts for a character to be recognized. Further, the shape of a hand-printed character is quite different depending on who wrote it or on the frame of mind at the time of writing it. In a conventional system for recognition of hand-printed characters, such variations of the shape of characters are absorbed by extracting very rough features of certain points of the character. This system, even though capable of recognizing hand-printed numerals, encounters a very great difficulty in recognizing hand-printed alphanumerics or hand-printed Japanese katakanas which involve a considerable number of characters.

Another system for recognition of hand-printed characters is such that line components of a hand-printed character are approximated by small straight lines and the result of such approximation is described in the form of Freeman direction codes thereby to recognize the character. In this particular system, the variations in the shape of hand-printed characters are absorbed by the sequential logic with direction codes as an input. This system has the disadvantage of a great amount of internal state of the sequential logic required for absorbing the variations in character shape in a satisfactory manner. Also, since the last-mentioned system relates to a deterministic decision as to "yes" or "no", it is difficult to accomplish recognition in the presence of a character variation which had not been taken into consideration in forming the sequential logic.

SUMMARY OF THE INVENTION

Accordingly, it is an object of the present invention to provide a character pattern recognition system capable of stable recognition against variations in character by describing the similarity between character patterns by a measure to indicate a difference in shape without being affected by the length of line components of a character pattern.

Another object of the invention is to provide a character pattern recognition system which is capable of easily rejecting characters other than the standard character pattern to be read.

Still another object of the invention is to provide a character pattern recognition system with a memory much smaller in capacity than the conventional memory for storing standard patterns.

A further object of the invention is to provide a character pattern recognition system for which standard patterns are capable of being added, removed or corrected easily to improve the reading accuracy.

In order to achieve the above-described objects, the present invention is characterized in that an input character pattern and a standard character pattern are described each in the form of a sequence of Freeman direction codes, the sequential relation of each direction code group is maintained, a one-to-multiple and multiple-to-one correspondence is allowed between the code groups to obtain a specific correspondence in which the sum of the difference between the direction codes is minimum, so that the minimum value of the sum of the differences of the direction codes under such a condition is used as a measure to detect a similarity between the two types of patterns.

BRIEF DESCRIPTION OF THE DRAWINGS

FIG. 9 is a diagram showing an example of classification.

DESCRIPTION OF PREFERRED EMBODIMENTS

Figure 1:
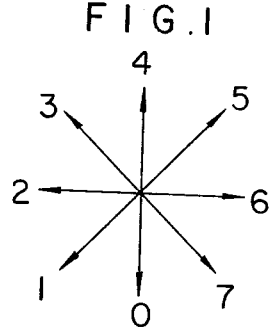
FIG. 1 is a diagram showing small straight lines for use in approximation of component lines of a character pattern.
Figure 3:
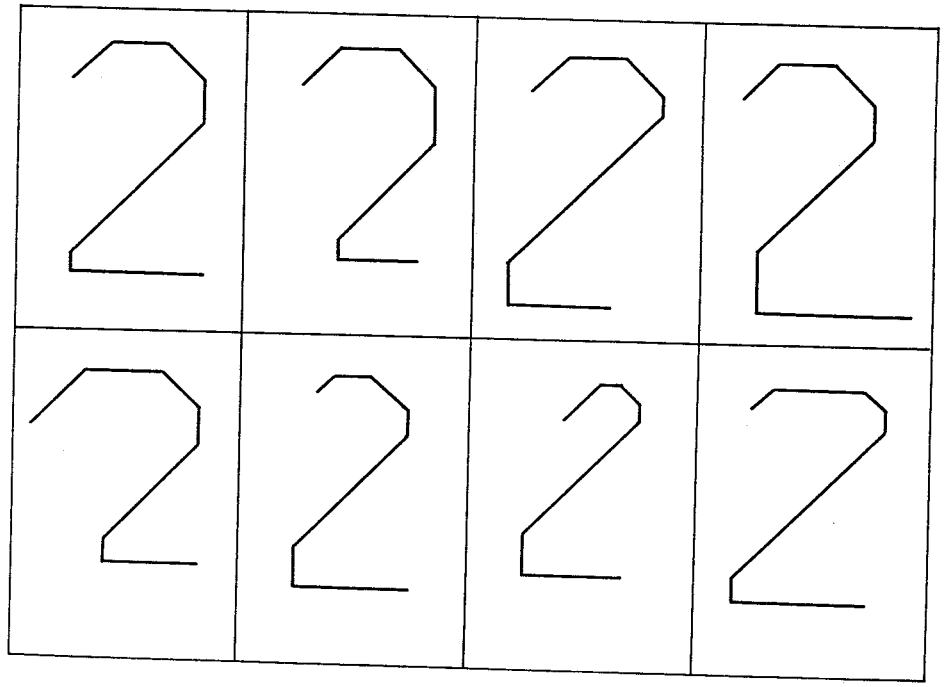
FIG. 3 is a diagram showing variations in the shape of a character due to the difference of the length of component line elements of the character.
Figure 2:
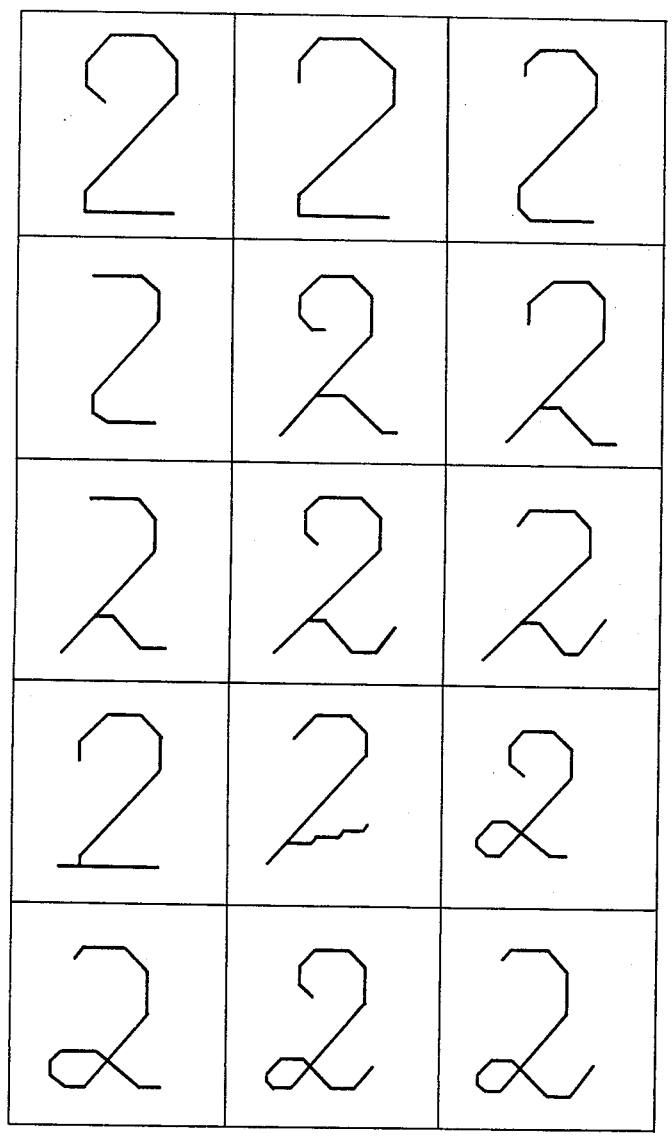
FIG. 2 is a diagram showing variations in the shape of a character.

In the description of the invention, it is assumed that character information is contained in lines as each character is made up of lines. Therefore, the character recognitions system according to the invention is based on the prerequisite that lines making up a character are approximated by a plurality of directional small straight lines. In this way, a variation in the shape of a character can be divided into a change in shape and a change in the length of line components. A variation in shape is due to variations of direction components of small straight lines making up the character and variations in the way they are connected. Numeral "2", for example, is considered to have variations in shape as shown in FIG. 2, if approximated by a plurality of small straight lines with eight directions as shown in FIG. 1. When the length of each component line of a character undergoes a change, the direction components of small straight lines and the way of connection thereof may remain substantially unchanged as shown in FIG. 3.

In the character pattern recognitions system according to the present invention, great changes in shape are absorbed by provision of a plurality of standard patterns representing the great changes as shown in FIG. 2, whereas relatively small changes in shape and changes in shape due to changes in length of the component lines are absorbed by the use of a measure representing the similarity between a couple of character patterns. The above-mentioned measure representing the similarity is such that component lines making up a character pattern are approximated by a plurality of small straight lines with directions, the results of the approximation are described in the form of a plurality of codes representing the directions of the small straight lines, the sequential relation of the codes is maintained for the two character patterns represented by the codes, and the one-to-multiple and multiple-to-one correspondence are allowed between the codes, so that a specific correspondence between the direction codes with a minimum sum of the differences between the direction codes subject to the correspondence is obtained and the measure of similarity is defined by the use of the minimum value of the differences between the direction codes under such a condition.

Figure 4:
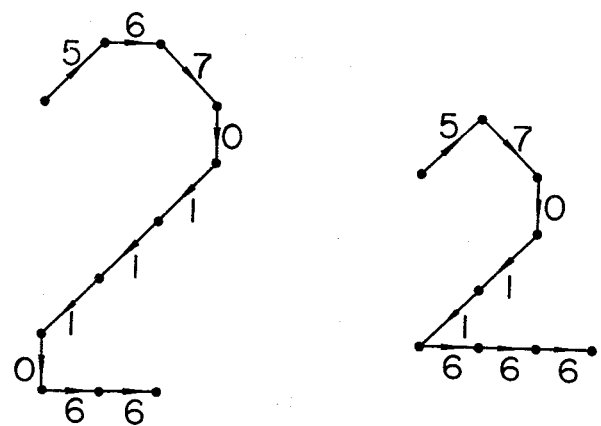
FIG. 4 shows an example in which component line elements of a character pattern are approximated by small straight lines.
Figure 5:
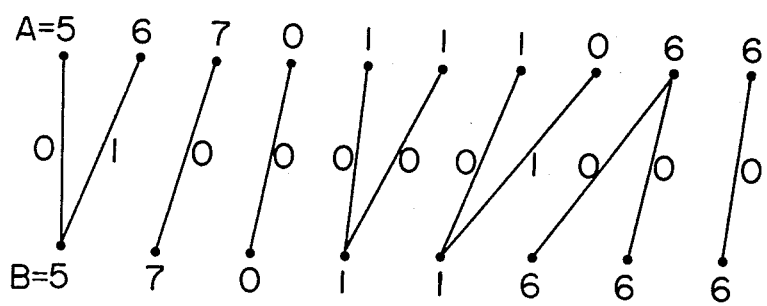
FIG. 5 is a diagram showing the correspondence between direction codes to absorb the difference in length of each line element between the two character patterns of FIG. 4.

For example, in the case of the two character patterns A and B shown in FIG. 4 approximated by small straight lines with 8 directions of FIG. 1, the direction codes for them are as shown in FIG. 5. While maintaining the sequential relation of these codes, the correspondence of one-to-multiple and multiple-to-one is effected thereby to achieve a specific correspondence in which the sum of the differences between the codes is minimum. As will be understood from this example, the partial differences of length of the component lines can be absorbed by the one-to-multiple and multiple-to-one correspondence, while the variation in shape can be expressed as the sum of the differences between the direction codes. If the sum of the difference between the direction codes is small, it means that the two patterns are very similar in shape. If such a value is large, on the other hand, it indicates that the character patterns are different in shape.

As will be noted from the above description, the problem in determining the measure for the similarity is how to effect the correspondence in which the sum of the differences between direction codes is minimum and how to obtain such a minimum value. This is comparatively easily achieved by a dynamic program. Therefore, as a measure to indicate the similarity between character patterns, the distance between the character patterns may be employed in the form of dynamic program.

An example of the measure for indicating the similarity between character patterns based on the foregoing description will be explained below.

First, as a prerequisite, the lines making up a character pattern are divided into a plurality of line segments called "branches" at terminal points and branch points. Each of the character patterns A and B is considered to comprise K branches, so that the codes of the branches are expressed as $$A_k = a_k(0), a_k(1) \ldots a_k(i) \ldots a_k(I_k)$$
$$B_k = b_k(0), b_k(1) \ldots b_k(j) \ldots b_k(J_k)$$

It is also assumed that each of the direction codes $a_k(i)$ and $b_k(j)$ is expressed by Freeman codes 0 to 7 as shown in FIG. 1 and the differences between the direction codes by the equations below, as an example.

$$d(a_k(i), b_k(j)) = |a_k(i) - b_k(j)| \text{ if } |a_k(i) - b_k(j)| \leq 4$$
$$\text{or } 8 - |a_k(i) - b_k(j)| \text{ if } |a_k(i) - b_k(j)| > 4. \quad (1)$$

With this as a prerequisite, the distance $d(A_k, B_k)$ representing the similarity between branches is defined in the form of a dynamic program as shown below.

$$g(0,0) = d(a_k(0), b_k(0))$$
$$g(i,j) = d(a_k(i), b_k(j)) + \text{Min} \{ g(i,j,-1)+\sigma, g(i-1,j)+\sigma[g(i-1, l,j-l)] \} \quad (3)$$

where [ ] shows Gauss' notation.

$$0 \leq i \leq I_k, 0 \leq j \leq J_k \quad (4)$$

$$J_k \times i \leq \delta(I_k + J_k) + I_k \times j \quad (5)$$

$$J_k \times i + \delta(I_k + J_k) \geq I_k \times j \quad (6)$$

$$d(A_k, B_k) = 1/N_k \, g(I_k, J_k) \quad (7)$$

Figure 6:
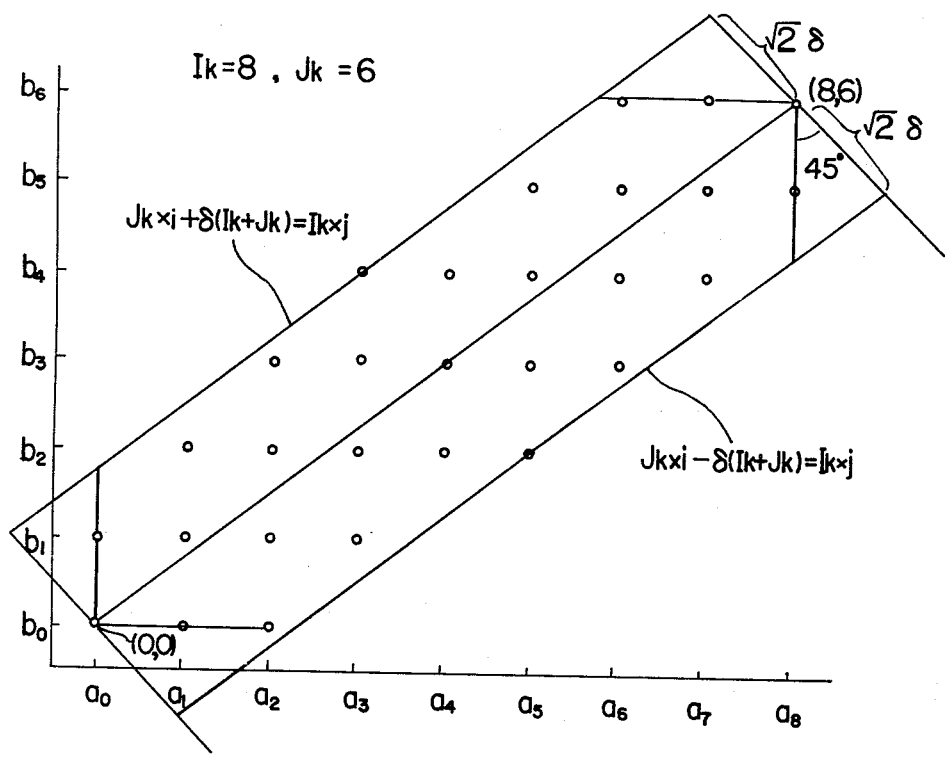
FIG. 6 is a diagram showing the tolerable range of correspondence.

In the equations above, $\sigma$ and Gauss' notation are provided for the purpose of enlarging the distance $d(A_k, B_k)$ between branches in the event that the change in the length of component lines is greater than a tolerable value. When the change in the length of component lines to $n$ times or $1/n$ ($n$ being an integer) is tolerable, $\sigma = (1/n-1) - \epsilon$ ($\epsilon$ is a very small positive number). $N_k$ is a variable for normalizing $g(I_k, J_k)$ by means of the length of direction codes and may take such a value as $N_k = (I_k + J_k2)/2$ or $N_k$ max $(I_k 1, J_k+1)$ depending on the object involved. In equations (4), (5) and (6) showing the tolerable ranges of $i$ and $j$ for correspondence, $\delta$ represents the width of a region parallel to the diagonal line connecting the coordinates (0,0) and $(I_k, J_k)$ as shown in FIG. 6. In the drawing under consideration, the tolerable range for correspondence is shown by symbol O, even though symbol O for the coordinate $(i, j)$ indicates the correspondence between $a_k(i)$ and $b_k(j)$. The tolerable range for correspondence defined above may also be determined as desired according to the object involved.

Next, the distance representing the similarity between character patterns is defined by the equation below $$d(A, B) = \frac{\sum_{k=1}^{k} \{ L_k \times d(A_k, B_k) \}^2}{\sum_{k=1}^{k} L_k} \quad (8)$$

wherein $L_k$ is a weight against branches and may be selected for example as $L_k = (I_k + J_k + 2)/2, L_k = \text{max} (I_k+1, J_k 1)$ or other value according to the object involved.

Figure 7:
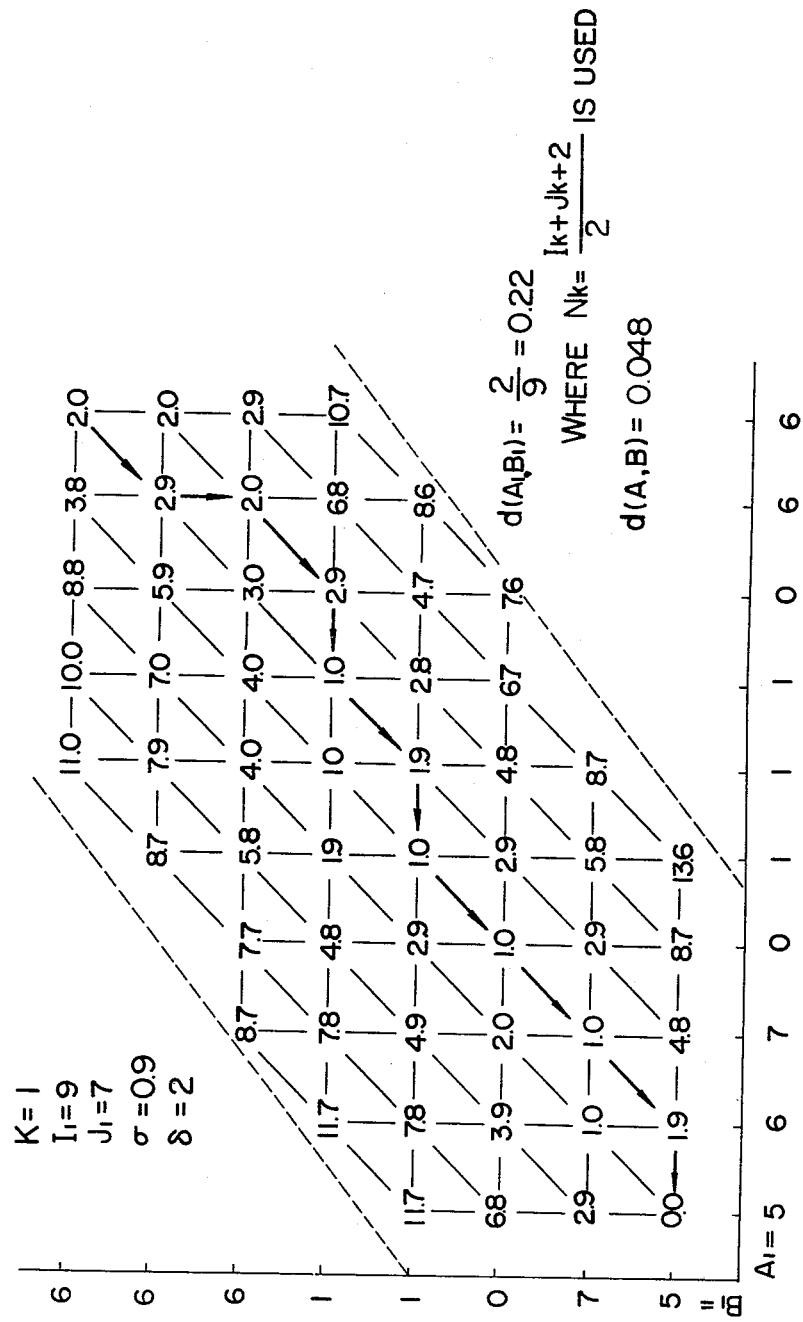
FIG. 7 is a diagram showing an example of calculation of distance for indicating the similarity between direction codes.

An example of calculation of the distance $d(A_k, B_k)$ associated with the two character patterns shown in FIG. 4 is shown in FIG. 7. In this example, it has been assumed that $\sigma = 0.9$, $\delta = 2$ and $N_k = (I_k+J_k2)/2$.

By tracing back from $g(I_k, J_k)$ to $g(i, j)$ which gives the minimum value of equation (3) following arrows in FIG. 7, the result of correspondence between the two types of direction codes is known, the correspondence of FIG. 5 being obtained from the result of calculation as shown in FIG. 7.

Explanation will be made in detail below of an embodiment of the present invention in which characters are recognized by the use of the above-mentioned distance representing the similarity between character patterns.

Figure 8:
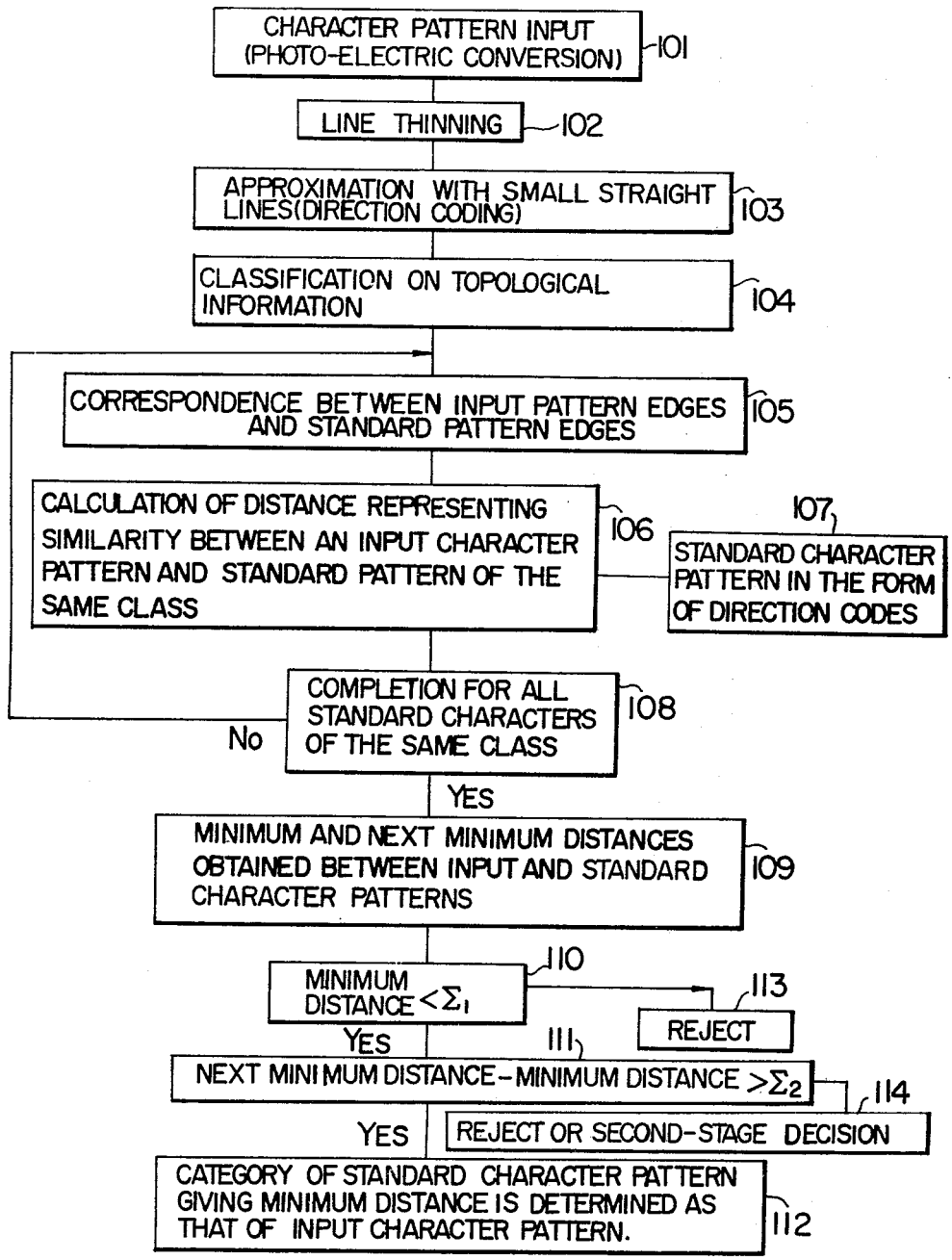
FIG. 8 shows steps for character recognition.

Processes for recognizing a character are shown in FIG. 8. Reference numeral 101 shows means for converting a character pattern into an electrical signal by a photo-electric transducer with a scanning device and stores it in the state ready for subsequent processes. In the event that a plurality of characters are input at the same time, a cutting process is required to separate character patterns one by one. Numeral 102 shows a means for thinning the original pattern for facilitating approximation which is effected by means of small straight lines in the next step 103. In other words, the line of the original pattern has the width containing a plurality of picture elements which it is difficult approximate directly by means of small straight lines. Therefore, it is converted by the thinning process into a line pattern with the width comprising a single picture element as shown in FIG. 4. It is of course possible to eliminate this process of thinning if there is a method available for direct approximation of the original pattern by means of small straight lines. Reference numerals 103 shows means for approximating the thinned character patterns by means of the small straight lines of FIG. 1 and converting the directions of the approximated small straight lines into direction codes along each branch, while at the same time extracting terminal points and branch points and connections between branches. Numeral 104 shows means for extracting from the results of process in 103 the topological characteristics of each character pattern such as the number of branches, number of loops and number of components or the number of sets of the branches connected so as to classify the input character patterns, as shown typically by the example in FIG. 9. Numeral 105 shows means for taking out one by one the standard character patterns of the same class as that of the input character patterns determined by the means 104 so that correspondence is accomplished between the branches of the input character pattern and the standard character pattern on the basis of information on the positions of terminal points and branch points and connection of the branches. Reference numeral 106 shows means for calculating the distance representing the similarity between the input character pattern and the standard character pattern by the use of the correspondence established between the branches by the means 105 and the equations (1) to (8) as well as by the use of the standard patterns stored in the means 107 in the form of direction codes. In view of the fact that the standard patterns stored in the means 107 take the form of direction codes, the capacity of the memory required for storage thereof may be small enough to facilitate the restoring of the shape of the standard patterns and hence the correction thereof. Numeral 108 shows means for deciding whether or not the distance calculation has been completed for all the standard patterns of the same class as the input character patterns. In the event that the distance calculation has not been completed for all the standard pattern of the same class as the input character patterns, the means 105 is returned to, whereas a transfer is made to the next means 109 if it is completed. Numeral 109 shows means for obtaining the minimum distance and the next minimum distance from the distance calculated by the means 105 to 108. It is assumed here that the category of the standard character pattern giving the next minimum distance is different from that of the standard character pattern giving the minimum distance. Numeral 110 shows means for producing a "reject" from the means 113 when the minimum distance is larger than a certain constant $\epsilon_1$. This indicates that the input character pattern is not included in the characters to be read on the basis of the standard character patterns provided. By the way, the value of $\epsilon_1$ is determined statistically by the results of experiments on reject. Numeral 111 shows means for determining the difference between the next minimum distance and the minimum distance and making a reject decision of means 114 or making the second stage decision by another recognition process when the difference is smaller than $\epsilon_2$. When the difference between the next minimum distance and the minimum distance is smaller than $\epsilon_2$, it indicates there are a plurality of standard character patterns of different categories similar to the input character pattern, which requires that the input character pattern be rejected as unidentifiable or subjected to the second-stage decision on the basis of more detailed information, the value of $\epsilon_2$ being also determined by the statistical data obtained from experiments on errors and reject. Reference numeral 112 shows means for deciding that the category of the standard character pattern giving the minimum distance is identical with the category of the input character pattern when the results of operation by the means 110 and 111 show that the minimum distance is smaller than $\epsilon_1$ and the difference between next minimum distance and minimum distance is larger than $\epsilon_2$.

In the above-described process for character recognition accomplished by the use of the distance representing the similarity between patterns according to the invention, the processes other than that of the means 106 are easily realized by the prior art. Therefore, the detailed description below will be concentrated on the process of the means 106 which forms a core of the present invention.

The process effected by the means 106 is based on equations (1) to (8). Since the device for effecting the calculation of equation (8) is easily realized by the well known prior art by means of an adder, multiplier and divider, detailed explanation will be made here of the devices for effecting the calculations from equations (1) to (7), that is, the devices for calculating the distance $d(A_k, B_k)$ representing the similarity between branches forming character patterns. For the sake of simplicity, however, the description will be limited to the case in which the maximum length of codes is 6, that is, $I_k \leq 5$ and $J_k \leq 5$.

Figure 10:
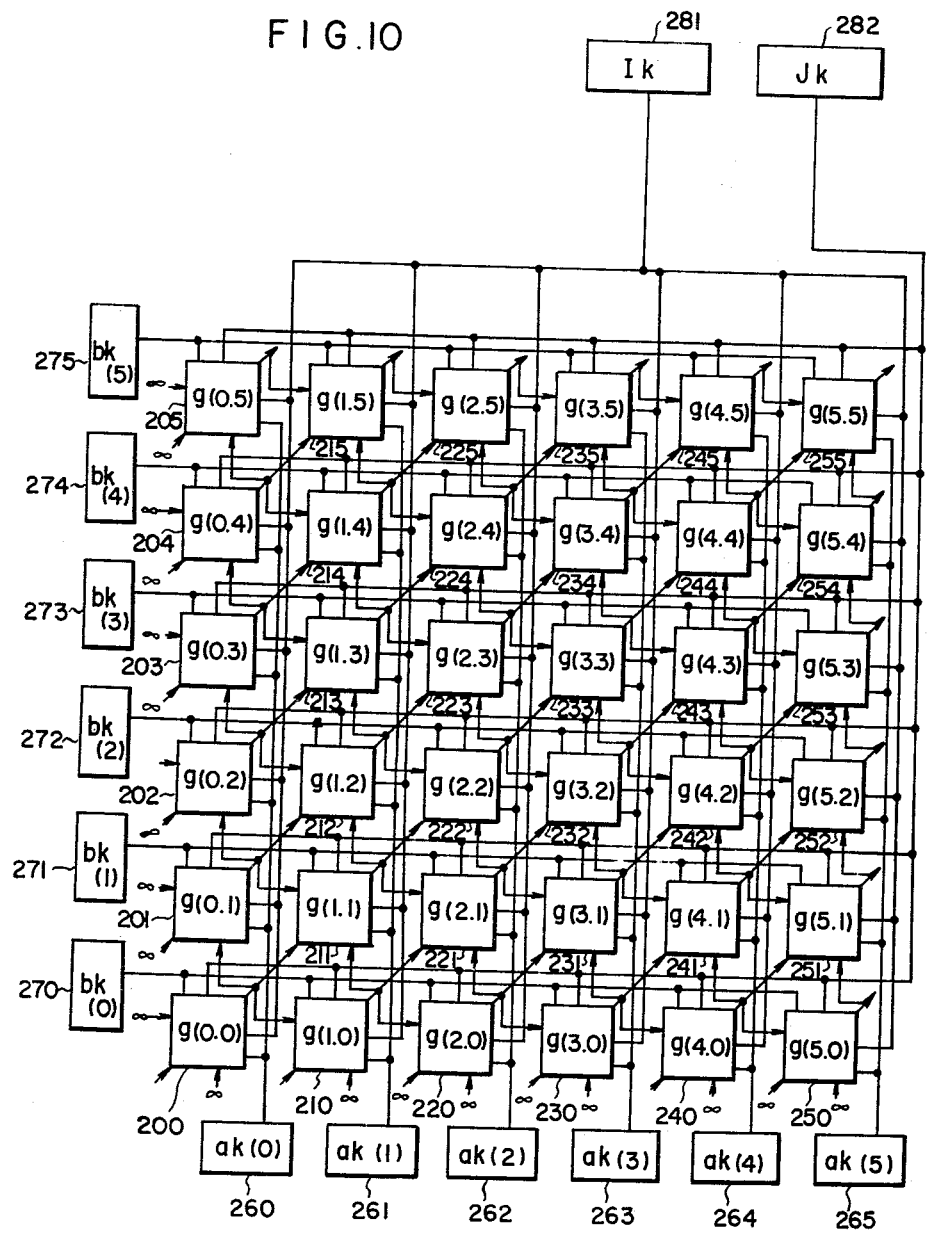
FIGS. 10 and 11 show the construction of a device for calculating the distance indicating the similarity between component line elements in the form of the direction codes.

First, the general construction of the devices will be explained with reference to FIG. 10 and FIG. 11. In FIG. 10, operation circuits 200 to 205, 210 to 215, 220 to 225, 230 to 235, 240 to 245 and 250 to 255 are for effecting the calculation of both the equation (3) and the restrictive conditions of equations (5) and (6), an actual construction of which is shown in FIG. 12. As the input to the operation circuit corresponding to $g(i, j)$, the output of the operation circuit corresponding to $g(i-1, j)$, $g(i, j-1)$ and $g(i-1, j-1)$ and signals corresponding to $a_k(i)$, $b_k(j)$, $I_k$ and $J_k$ are impressed as shown in FIG. 12. It is assumed here that the output of the operation circuit (not shown) corresponding to $g(-1, j)$, $j$ being $0 \ldots, 5$ and $g(i, -1)$, $i$ being $0 \ldots, 5$ is infinite or the greatest available value and that the output of the operation circuit (not shown) corresponding to $g(-1, -1)$ zero. Also, the output of the operation circuit (not shown) corresponding to $g(i,j)$ is connected to the input to the operation circuit corresponding to $g(i, j+1)$, $g(i+1, j)$ and $g(i+1, j+1)$. Reference numerals 260 to 265 show registers for storing signals corresponding to the direction codes for $A_k$ including $a_k(0) \ldots, a_k(5)$. The output of the register, say, 265 for storing $a_k(i)$ is connected to the input to the operation circuits, say, 200 to 205, corresponding to $g(i,j)$, $j$ being $0 \ldots, 5$. Numerals 270 to 275 show registers for storing signals corresponding to direction codes for $B_k$ including $b_k(0), b_k(1) \ldots, b_k(5)$, and the output of the register, say, 270 for storing $b_k(j)$ is connected to the input of the operation circuits, say 200, 210, 220, 230, 240 and 250 corresponding to $g(i,j)$, $i$ being $0, 1 \ldots, 5$. Reference numeral 281 shows a register for storing a signal corresponding to the length of the direction codes for $A_k$, and the output thereof is connected to all the inputs to the operation circuits corresponding to $g(i,j)$, $i$ or $j$ being $0, 1 \ldots 5$. Reference numeral 282 shows a register for storing a signal corresponding to the length of the direction codes for $B_k$, and the output thereof is connected to all the inputs to the operation circuit corresponding to $g(i,j)$, $i$ or $j$ being $0, 1 \ldots, 5$.

Figure 11:
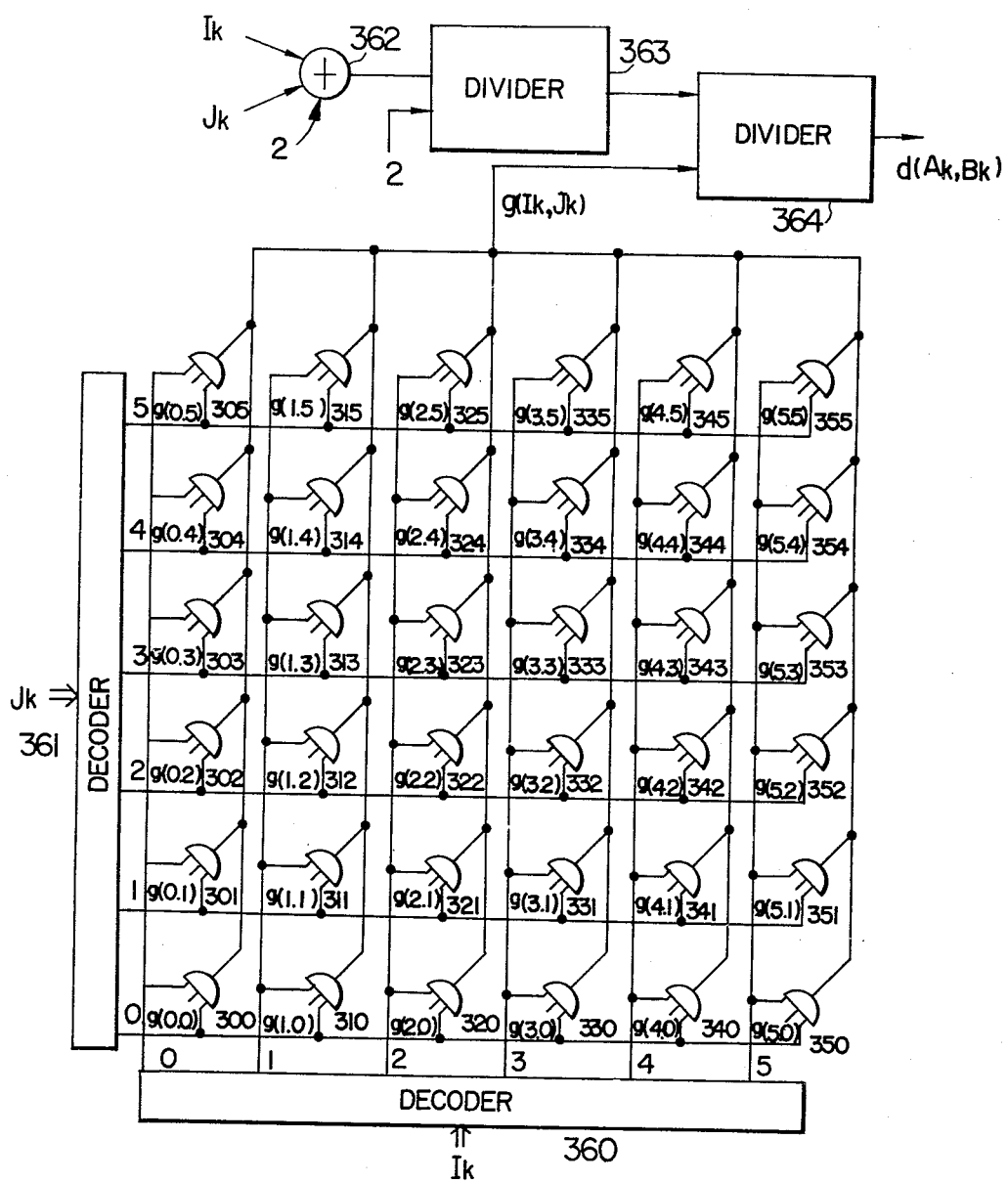
Figure 12:
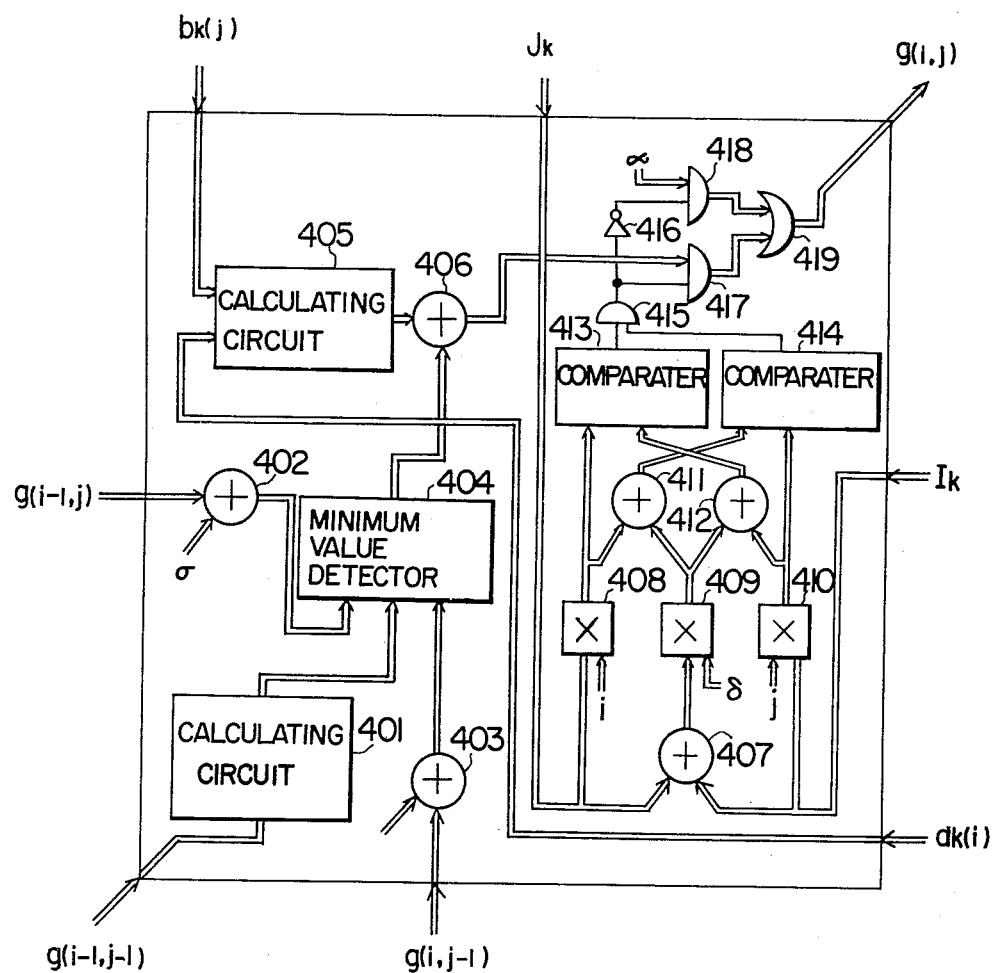
FIG. 12 is a diagram showing the construction of a circuit for calculating the value of $g(i,j)$ in equation (3) and for determining the conditions of equations (5) and (6).

A device for selecting the value of $g(I_k, J_k)$ from the result of calculation made by the device of FIG. 10 and for making the calculation of equation (7) is shown in FIG. 11. Reference numeral 360 shows a decoder to which the output $I_k$ of the register as shown in FIG. 10 is applied. Numeral 361 shows another decoder the input of which is connected with the output of $J_k$ of the register 282 shown in FIG. 10. Numerals 300 to 305, 310 to 315, 320 to 325, 330 to 335, 340 to 345, and 350 to 355 show AND gates for selecting the output $g(I_k, J_k)$ from the output $g(i,j)$ of the operation circuits 200 to 205, 210 to 215, 220 to 225, 230 to 235, 240 to 245 and 250 to 255 shown in FIG. 10. The output of the operation circuit corresponding to $g(i, j)$, the $i$-th output of the decoder 360 and the $j$-th output of the decoder 361 are applied to the input of each of the AND gates, the output of which go through a wired OR operation and is applied to the input of the divider 364 in the form of signal $g(I_k, J_k)$. Reference numeral 362 shows an adder to which the outputs from the registers 280 and 282, that is, $I_k$ and $J_k$ and the constant 2, as shown in FIG. 10 are applied and which produces an output $(I_k + J_k+2)/2$. The output of the adder and the constant 2 are applied to the divider 363, and as a result the divider produces an output $(I_k+ J_k+2)/2$. Numeral 364 shows another divider to which the output of the divider 363 and the above-mentioned signal corresponding to $g(I_k, J_k)$ are applied and which produces an output in the form of $d(A_k, B_k)$ of equation (7).

Apart from the general construction of the apparatus according to the invention, description will be made below of the detail of the operation circuits 200 to 205, 210 to 215, 220 to 225, 230 to 235, 240 to 245 and 250 to 255 for calculating the value of $g(i, j)$ of FIG. 10.

Figure 13:
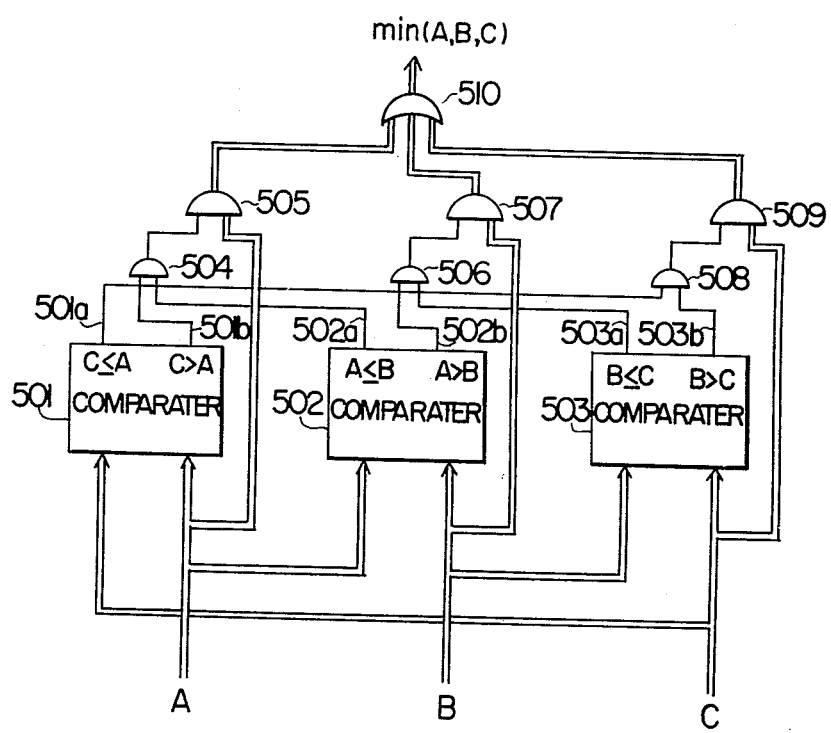
FIG. 13 is a diagram showing the construction of a minimum value detector circuit.

With reference to FIG. 12 showing the construction of the operation circuits, the input to the operation circuits comprises signals corresponding to $g(i-1, j)$, $g(i, j-1)$, $g(i-1, j-1)$, $a_k(i)$, $b_k(j)$, $I_k$ and $J_k$, while the output thereof are made up of a signal corresponding to $g(i, j)$. Numeral 401 shows a circuit for discarding fractions below the decimal point and calculating the value $g(i-1,j-1)$, this circuit being easily realizable by placing zero as digits below the decimal point. Numerals 402 and 403 show adders for calculating $g(-1, j) + \sigma$ and $g(i, j-1) + \sigma$ respectively. Numeral 404 shows a minimum value detector circuit for calculating $\min\{g(i-1, j) + \sigma, g(i, j-1) +\sigma, [g(-1, j-1)]\}$ which can be realized easily by the prior art as shown in FIG. 13. The minimum value detector circuit as shown in FIG. 13 is such that signals A, B and C are applied to it and the minimum value $\min(A, B, C)$ is produced therefrom. This minimum value detector circuit comprises comparators 501 to 503, AND gates 504 to 509 and OR gate 510. If $A>B>C$, as an example, an output 1 is obtained from each of the output lines 501a, 502b and 503b of the comparators 501, 502 and 503 respectively, so that 0 signals are produced at the output lines 501b, 502a and 503a. As a result, the AND gates 504 and 506 are closed whereas the AND gate 508 is opened to produce a 1 signal. The signal C is thus produced through the AND gate 509 and the OR gate 510. In other words, when $A>B>C$, the minimum signal C is obtained as an output.

Figure 14:
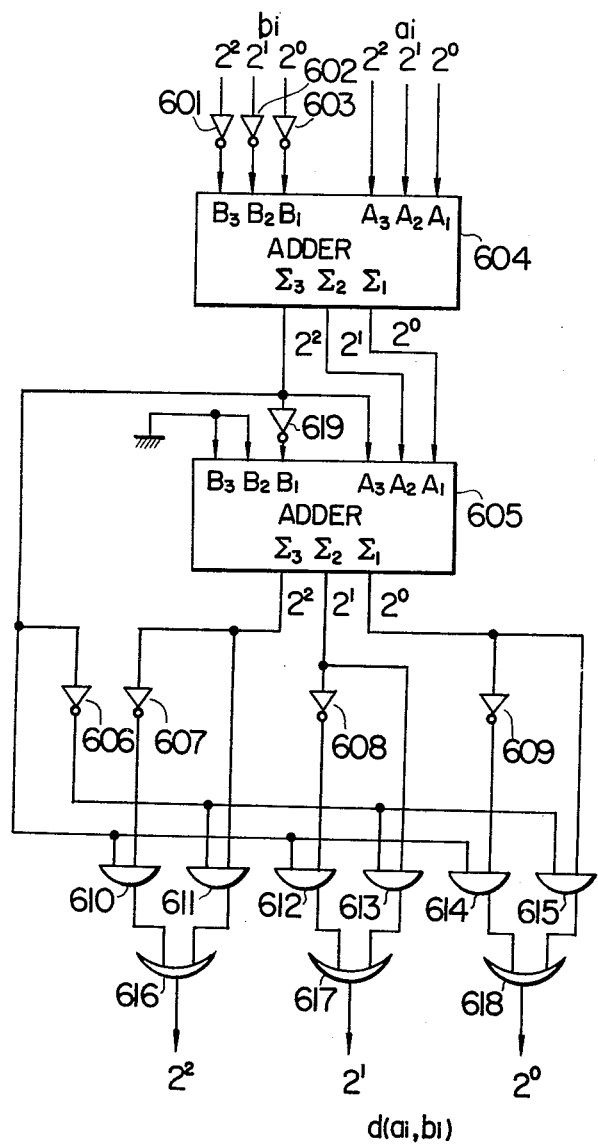
FIG. 14 is a diagram showing the construction of a circuit for calculating the difference between the direction codes in equation (1).

Turning back to FIG. 12, reference numeral 405 shows a direction difference calculating circuit for calculating $d(a_k(i), b_k(j))$ of equation (1), which can be realized by the device with the construction shown in FIG. 14. Assume that the direction of $a_i$ is 1 in Freeman code of FIG. 1 and the direction of $b_i$ 7. The direction code of $a_i$ is 001 and that of $b_i$ 111 The direction code 001 of $a_i$ is applied directly to the adder 604, while the direction code of $b_i$ is applied to the adder 604 after being reduced to 000 by inversion at the inverters 601, 602 and 603. Therefore, the output of the adder 604 becomes 001 which forms an input to the adder 605 in the next stage. At the same time, the signal 0 of the order $2^2$ of the output of the adder 604 is inverted by the inverter 619 thereby to change its state to 1, thus constituting a signal of the order $2^0$ as the other input to the adder 605, the input signals of the orders $2^1$ and $2^2$ being grounded. As a result, one of the inputs to the adder 605 becomes 001 and the other input 001, so that the output of 010 is produced. The output signal 0 of the order $2^2$, on the other hand, is inverted by the inverter 606 into 1 and applied to the AND gates 611, 613 and 615 to open the same. The output signal 010 from the adder 605 is passed through the AND gates 611, 613 and 615, and further through the AND gates 616, 617 and 618, produced as an output satisfying equation ($i$) as it indicates 2 or the direction difference between 1 and 7 of Freeman code in FIG. 1.

Reference numeral 406 in FIG. 12 shows an adder to which the outputs from the direction difference calculating circuit 405 and the minimum value detector circuit 404 are applied for calculating $d(a_k(i), b_k(j)) + \min\{g(i-1, j) + \sigma, g(i, j-1) +\sigma, [g(-1, j-1)]\}$. Reference numerals 407 to 415 show circuits for deciding whether or not the restrictive conditions expressed by the equations (5) and (6) are met against the coordinate $(i, j)$ where the circuit for calculating $g(i, j)$ is disposed. Numeral 407 shows an adder the inputs to which are connected to $I_k$ and $J_k$ for calculation of $I_k + J_k$. Reference numerals 408 and 410 show multipliers to which $J_k$ and $i$, and $I_k$ and $j$ are applied for calculation of $J_k \times i$ and $I_k \times j$ respectively. Numeral 409 shows a multiplier for the adder 407 which calculates $\delta (I_k + J_k)$ in response to the output of the adder 407 and the constant $\delta$. Numerals 411 and 412 show adders to which the outputs from the multiplier 408 and the multiplier 409 and the outputs from the multiplier 409 and the multiplier 410 are applied for calculation of $i \times J_k + \delta (I_k + J_k)$ and $j \times I_k + \delta(I_k + J_k)$ respectively. Numeral 413 shows a comparator which compares the outputs from the multiplier 408 and the adder 412 and produces a 1 signal when the condition $J_k \times i \leq \delta (I_k + J_k) + I_k \times j$ of equation (5) is met, whereas a 0 signal is produced when it is not satisfied. Numeral 414 shows another comparator which compares the outputs from the multiplier 410 and the adder 411 and produces a 1 signal when the condition $J_k \times i + \delta(I_k + J_k) \geq I_k \times j$ of equation (6) is met, a 0 signal being produced when it is not satisfied. Numeral 415 shows an AND circuit to which the outputs from the comparators 413 and 414 are applied and which produces a 1 output only when the conditions of equations (5) and (6) are met, a 0 output being produced when the conditions are not met. Numeral 416 shows a NOT circuit for inverting the output of the AND gate 415. Numeral 417 shows an AND gate to which the outputs from the AND gate 415 and from the adder 406 are applied and which allows the output of the adder 406 to pass therethrough only when the conditions of equations (5) and (6) are satisfied at the same time. Numeral 418 shows an AND gate to which the output from the inverter 416 and the constant $\infty$ (the available maximum value) are applied and which allows the constant $\infty$ to pass therethrough only when the conditions of equation (5) and/or equation (6) is not met. Numeral 419 shows an OR gate which produces a logical sum of the outputs of the AND gates 417 and 418.

The above-mentioned device for calculating the distance representing the similarity between branches by means of equations (1) to (7), the constuction of which has been described above, operates so asynchronously that if $I_k$, $J_k$, $a_k(0)$ to $a_k(I_1)$ and $b_k(0)$ to $b_k(J_k)$ are set in the registers 281, 282, 260 to 265 and 270 to 275, $d(A_k, B_k)$ is obtained as the output from the divider 364 shown in FIG. 11.

It will thus be seen that the objects set forth above, among those made apparent from the preceding description, are efficiently attained, and since certain changes may be made in the above descriptions without departing from the spirit and the scope of the invention, it is intended that all matter contained in the above description or shown in the accompanying drawings shall be interpreted as illustrative and not in a limiting sense.

We claim:

1. In a character recognition system in which line components making up an unknown character pattern and a standard character pattern are approximated by means of a plurality of directional small straight lines in the number of $n$, each of the patterns being described in the form of a plurality of codes representing the directions of said small straight lines along said component lines, said two code groups $A_k = a_k(0), a_k(1), a_k(2) \ldots a_k(I_k)$, and $B_k = b_k(0), b_k(1), b_k(2) \ldots b_k(J_k)$ being used to effect a character recognition; the improvement comprising first and second registers for respectively storing said direction codes $A_k$ and $B_k$, a direction difference calculator circuit for calculating the difference between the direction codes, that is, $d(a_k(i), b_k(j))$
$= |a_k(i) - b_k(j)|$ if $|a_k(i) - b_k(j)| \leq (n/2)$
$= n - |a_k(i) - b_k(j)|$ if $|a_k(i) - b_k(j)| > (n/2)$, in response to the direction codes $a_k(i)$ and $b_k(j)$ sequentially applied thereto from said first and second registers, a minimum value detector circuit for obtaining the minimum value of $g(i, j-1) + \sigma$, $g(i-1, j) + \sigma$, and $[g(-1)]$, $\sigma$ being constant, when $d(a_k(0), b_k(0))$ is defined as $g(0, 0)$, an adder for obtaining a sum $g(i, j)$ of the output $d(a_k(i), b_k(j))$ of said direction difference calculator circuit and the output min$\{g(i, j-1) + \sigma, g(i-1, j) + \sigma, [g(i-1, j-1)]\}$ of said minimum value detector circuit, and a circuit means for taking out the output $g(I_k, J_k)$ from the output $g(i, j)$ of said adder.

2. A character recognition system according to claim 1, further comprising an adder for obtaining the sum of $I_k$ and $J_k$ and the constant 2 representing the length of said codes, and dividing means for producing $2g(I_k, J_k)/(I_k + J_k + 2)$ in response to the application thereto of the output $g(I_k, J_k)$ of said circuit means and the output $(I_k + J_k + 2)$ of said adder.

* * * * *